March 24, 1925.

H. D. WILLIAMS

POWER TRANSMITTING DEVICE

Filed July 13, 1921 2 Sheets-Sheet 1

1,530,966

INVENTOR.
Harvey D. Williams
BY Lotka
Kuhlenbeck
& Mathé
ATTORNEYS

March 24, 1925.

H. D. WILLIAMS

POWER TRANSMITTING DEVICE

Filed July 13, 1921　　2 Sheets-Sheet 2

1,530,966

INVENTOR.
Harvey D. Williams
BY Loева, Kehlenbeck & Mathé
ATTORNEYS

Patented Mar. 24, 1925.

1,530,966

UNITED STATES PATENT OFFICE.

HARVEY D. WILLIAMS, OF WALLINGFORD, CONNECTICUT, ASSIGNOR TO THE WATERBURY TOOL COMPANY, OF NEW HAVEN, CONNECTICUT, A CORPORATION OF CONNECTICUT.

POWER-TRANSMITTING DEVICE.

Application filed July 13, 1921. Serial No. 484,287.

*To all whom it may concern:*

Be it known that I, HARVEY D. WILLIAMS, a citizen of the United States, and resident of Wallingford, in the county of New Haven and State of Connecticut, have invented certain new and useful Improvements in Power-Transmitting Devices, of which the following is a specification.

This invention relates to power-transmitting devices, and particularly to such which permit the speed of the driven part or mechanism to be altered readily. In its preferred embodiment, the invention comprises a plurality of driving means by which a plurality of driven parts or devices may be operated at a variable relative speed. The improved drive has been designed particularly for use in connection with that type of paper-making machinery which has several sections or units, each of which is driven at approximately the same speed, but in which provision is required for changing the relative speed of the sections or units with great accuracy within a certain range. From a study of the disclosure made herein it will be obvious, however, that the invention may be used in other relations as well.

Without desiring to restrict myself to the specific embodiment illustrated herein, I will now proceed to describe in detail a construction which I consider satisfactory and preferable for use in connection with paper making machinery as mentioned above.

Figure 1:
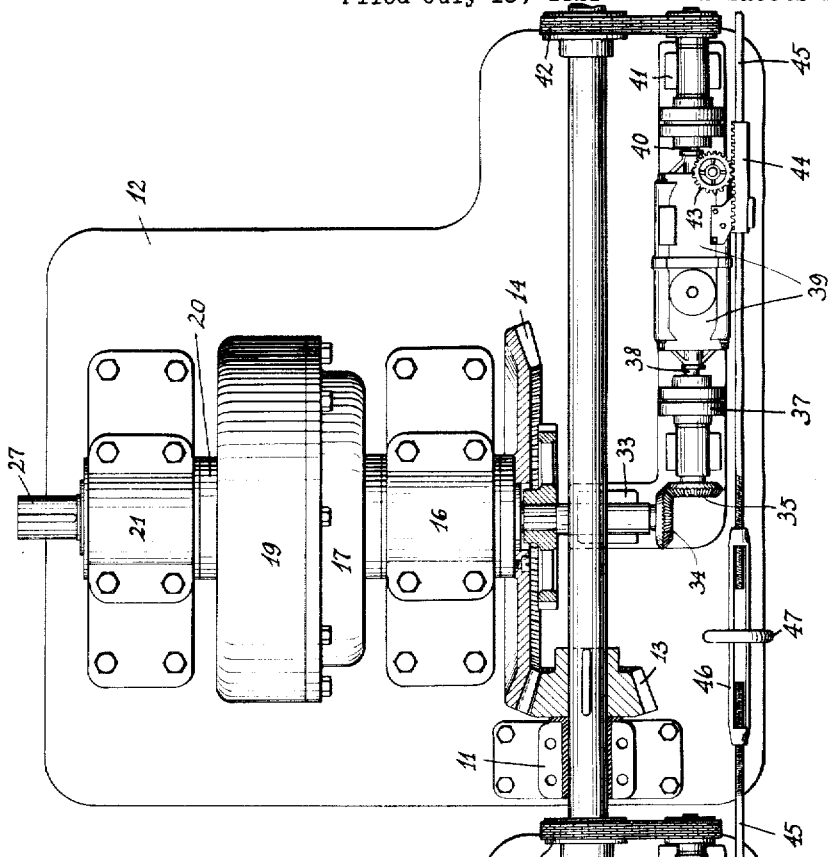
Figure 1:
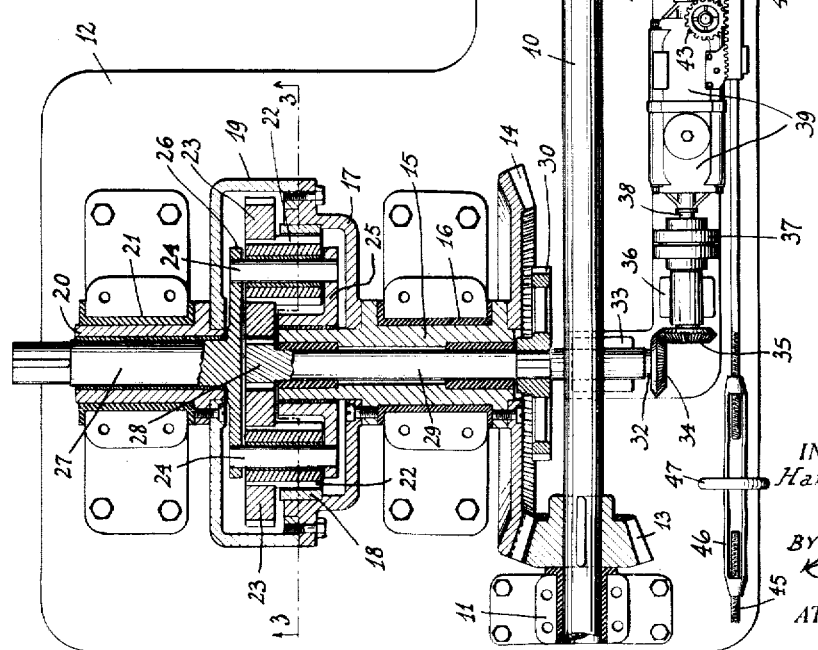
Figure 2:
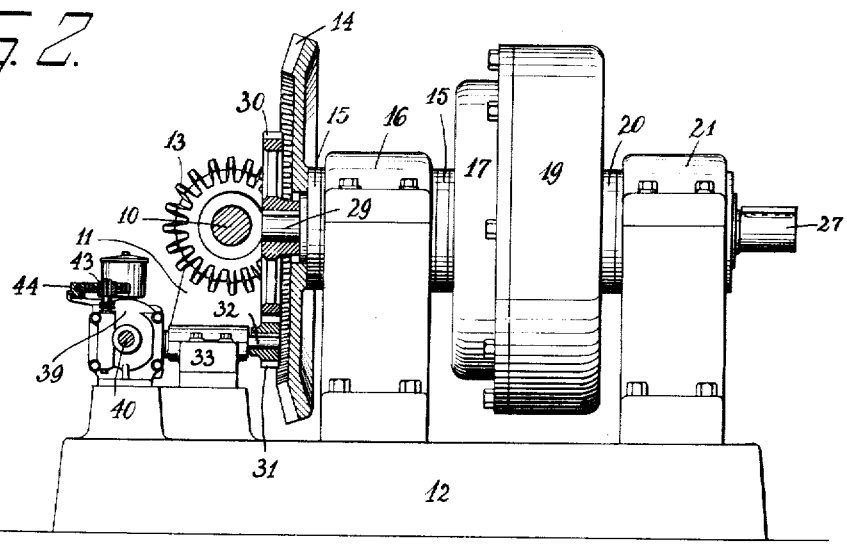
Figure 3:
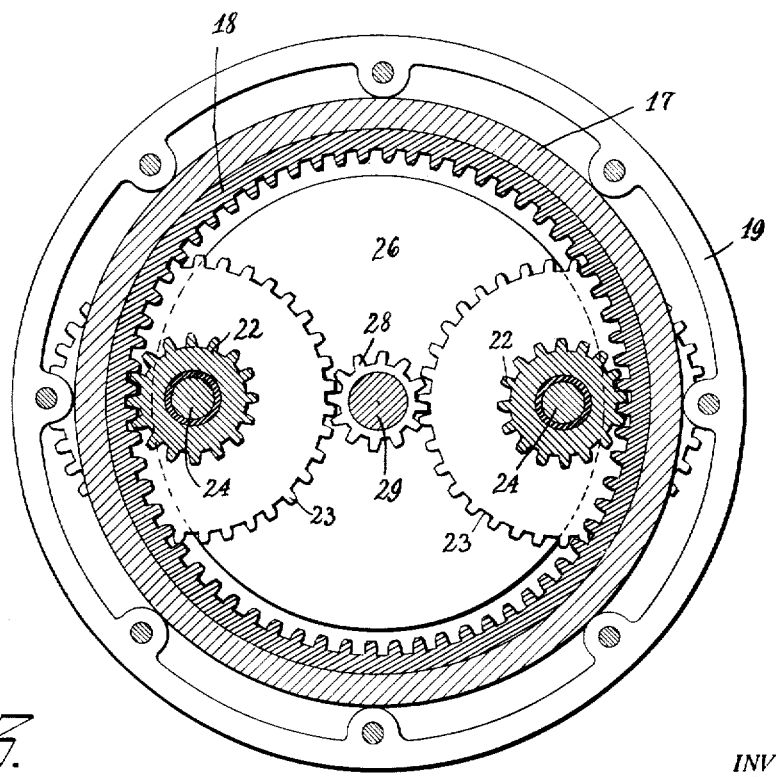

In the accompanying drawings Fig. 1 is a general plan view of my improved power-transmitting device, as designed for paper-making machinery, two sections or units of such machinery-driving or power-transmitting device being illustrated, and some parts being shown in section; Fig. 2 is an end view, with parts in section, and Fig. 3 is a vertical section on line 3—3 of Fig. 1, upon an enlarged scale.

The main line shaft 10 is journaled in suitable bearings 11 on the supports or bases 12, two such bases being shown in Fig. 1, but it will be understood that the machine may comprise a larger number of bases and corresponding sections or units. At each of such sections, the shaft 10 carries a driving gear 13, here shown as a bevel pinion, in mesh with a corresponding gear 14 secured rigidly to a sleeve or hollow shaft 15 journaled in a bearing 16 and extending at right angles to the shaft 10, the axes of said shafts intersecting. With the shaft 15 is connected rigidly a plate or cup 17 having an internal gear 18. To the cup 17 is secured rigidly another cup 19, connected rigidly with a hollow shaft 20 journaled in a bearing 21 and having its axis in line with that of the hollow shaft 15.

The internal gear 18 meshes with a plurality of planetary pinions 22 which, together with larger gears 23 rigid with the respective pinions 22, are mounted to turn on axles 24 extending parallel to the axis of the shafts 15, 20, at equal distances from said axis. These axles 24 serve as connecting members for two plates 25 and 26, the former being fitted loosely upon one end of the shaft 15, while the plate 26 is made rigid or integral with a shaft 27 fitted loosely within the hollow shaft 20, the projecting end of said shaft 27 being adapted for connection with the particular device, unit, or element to be driven. The cups 17, 19 form a housing for the plates 25, 26, the projecting end of the shaft 15, the axles 24, the gears 22, 23, and a pinion 28 in mesh with the gears 23, said pinion being mounted on a shaft 29 extending loosely through the hollow shaft 15. On said shaft 29 is mounted rigidly a spur gear 30 in mesh with a spur pinion 31 on a shaft 32 parallel to the shaft 29 and journaled in stationary bearings 33.

The shaft 32 may be held stationary, or driven at various speeds, in either direction, by the following mechanism: A mitre gear 34 on said shaft 32 meshes with a like mitre gear 35 on a short shaft parallel to the main line shaft 10 and journaled in a stationary bearing 36. By a flexible coupling 37 of any approved construction, said short shaft is connected with an aligning shaft 38 which is the driven or "output" shaft of a hydraulic variable speed gear indicated at 39; the driving or "input" shaft of such speed gear is indicated at 40, and its bearing at 41. The shaft 40 is operated in any suitable manner, for instance from the main line shaft 10, by means of a chain drive indicated at 42. The hydraulic variable speed gear indicated at 39 is of a type well-known in the art, an example being found in United States Letters Patent No. 925,148 issued to me on June 15, 1909. Apparatus of this kind embodies two halves or sections, as plainly indicated in Fig. 1, where the right-hand half of each device 39 is the driving or "input" section, and the left-hand half constitutes the driven or "output" section. The details of this variable speed gear have not been illustrated herein, but it will be understood that each of the shafts 38 and 40 is connected with a set of cylinders and with a rotary "swash-plate" which is held oblique or inclined, at a fixed angle, in the "output' or left-hand section, while in the "input" or right-hand section the swash-plate may be adjusted to different angles, as by turning the wheel 43, which may be considered the equivalent of the handwheel 38 shown in my aforesaid patent. It will be understood that when the swash-plate of the driving section is perpendicular to the shaft 40, the shaft 38 will remain stationary, and the pinion 28 likewise, so that the gearing interposed between the shafts 15 and 27 will operate after the manner of an ordinary planetary transmission, with the exception that there is an increase in speed owing to the fact that, instead of having the same gear (such as 23) engage both the rotating driving gear 18 and the stationary toothed member 28, there are two connected gears 22, 23 of which the smaller engages the driving gear 18 while the other, 23, rolls on the stationary member 28. With the numbers of teeth on the several gears as shown on the drawing, a speed of 298 R. P. M. on the main line shaft 10 will give a speed of 108⅓ R. P. M. on the housing 17, 19, and 100 R. P. M. to the driven shaft 27 when the pinion 28 is held stationary. If by turning the wheel 43 the swash-plate of the driving section is set obliquely to the shaft 40, the output shaft 38 and the shaft 29 will be driven in one direction or the other, according to whether the direction of obliquity is the same as that of the fixed-angle swash-plate on the driven side, or opposite thereto, and the speed of said shafts 38, 29 will depend on the angle which the swash-plate of the driving or "input" section forms with a plane perpendicular to the shaft 40. A differential motion of the shaft 27 is thus obtained, the shaft 15 driving the said shaft 27 in one direction, by the mechanism described, and the pinion 28, on which such mechanism rolls, rotating it in either one direction or the other, at a variable speed, so that the motion imparted to the shaft 27 by the internal gear 18 will either be accelerated or retarded, within certain limits, by the simultaneous rotation of the pinion 28. In some cases it may suffice to provide for acceleration only, or for retardation only, that is to say, in such cases it will not be necessary to reverse the inclination of the adjustable swash-plate. Also, the flexible coupling 37 might be omitted in some cases, in which event the mitre gear 35 would be mounted directly on the "output" shaft 38. I may thus effect a very accurate adjustment of the speed at which the shaft rotates.

If the several wheels 43 are arranged to be operated independently (and such a construction would be within the scope of my invention), each section or unit of the machine may have the speed of its shaft 27 adjusted independently of the other sections. In some cases it is desirable to adjust the speed of two or more units or sections simultaneously, and in Figs. 1 and 2 I have shown, by way of example, an arrangement for effecting such simultaneous adjustment; the particular type here illustrated will effect the acceleration of one or more sections and a simultaneous retarding of one or more neighboring sections. The wheels 43 are represented as gear wheels in mesh with racks 44 mounted to slide lengthwise, the racks of adjacent sections being connected by aligning rods 45 the adjacent ends of which are screw-threaded in opposite directions and engaged by correspondingly threaded portions of turnbuckles 46 provided with handwheels 47. If any one of the handwheels 47 is turned, the two rods or racks 45 connected by the corresponding turnbuckle 46 will be brought either closer together or farther apart, according to the direction in which said wheel 47 is turned, thus effecting a relative speeding up of the machine section connected with one of said racks, and as compared with the machine section connected with the other of said racks. All the machine sections to the left of the handwheel 47 so operated will be affected in the same manner (accelerated or retarded) relatively to all the sections of the machine to the right of such handwheel, since the sliding movement imparted to any rod or rack 45 by operating the turnbuckle 46 which engages such rack, will be communicated, to the same extent, to all the racks 45 which lie on the same side of the turnbuckle thus rotated.

As stated above, my present invention is applicable particularly to the type of paper-making machine having several units or sections each of which is driven at approximately the same speed, but where it must be possible to vary the speed of each section, relatively to the others, through a certain (small) range with great accuracy. Of course, a drive of the same character as set forth herein might be employed in many other relations, for instance for metal-rolling machinery having sections operated in tandem, or rubber-making machinery having sections operated in series. It will therefore be readily understood that various modifications may be made without departing from the nature of my invention as defined in the appended claims.

I claim as my invention:

1. A device of the class described, comprising a plurality of power-transmitting units each having a driven carrier, two co-axial driving gears, and a toothed member in mesh with one of said gears and adapted to roll on the other gear, means for rotating in unison the like gears of the several units, and individually regulatable means for rotating the other driving gears of the several units.

2. A device of the class described, comprising a plurality of power-transmitting units each having two co-axial driving gears and planetary mechanism in mesh with both of them, unitary means for driving one of the gears of each unit at the same speed, and separate individually regulatable means for rotating the other driving gears of the several units.

3. A device of the class described, comprising a plurality of power-transmitting units or sections, variable speed driving devices for the individual sections, individual speed-adjusting devices for the several sections and a connection between driving devices of different sections to cause their speed to be adjusted with opposite effect.

4. A device of the class described, comprising a plurality of power-transmitting units or sections, variable speed driving devices for the individual sections, individual speed-adjusting devices for the several sections and an operative connection between said devices to cause the speed of one of them to be varied relatively to the speed of another section.

5. A device of the class described, comprising a plurality of power-transmitting units or sections, variable speed driving devices for the individual sections, speed-adjusting members for each of said sections, and a connection between adjacent speed-adjusting members to cause them to move simultaneously in opposite directions and with opposite effect.

6. A device of the class described, comprising a plurality of power-transmitting units or sections, variable speed driving devices for the individual sections, sliding speed-adjusting members for each of said sections, located in alignment with each other and threaded at their adjoining portions, and a turnbuckle for shifting such sliding members simultaneously in opposite directions.

7. A device of the class described, comprising a plurality of power-transmitting units or sections, variable speed driving devices for the individual sections, sliding speed-adjusting members located in longitudinal alignment and operatively connected with the individual sections, said members beings spaced from each other and screw-threaded at their adjacent ends, turnbuckles mounted on said threaded ends of two adjacent speed-adjusting members and adapted to share the longitudinal motion of said members, whereby upon the turning of a particular turnbuckle, all the speed-adjusting members and all the turnbuckles to one side of such turnbuckle will be moved in one direction, and all the turnbuckles and speed-adjusting members on the other side of such turnbuckle will be moved in the opposite direction.

8. A device of the class described comprising a plurality of power transmitting units or sections, variable speed driving devices capable of being adjusted to different set positions for driving said sections at different speeds, a controlling device for each of said variable speed devices to adjust its respective device to set position and a connection between the controlling devices of different sections to cause them to be adjusted to produce an opposite speed effect upon their respective speed devices.

9. A device of the class described, comprising a plurality of power transmitting units or sections, a variable speed driving device for each of said sections, a controlling device for each of said variable speed driving devices, means to connect all of the controlling devices to cause them to be operated simultaneously to produce a similar change of speed in each of said variable speed devices, said connecting means including means for permitting said controlling devices to be actuated to produce a change of speed in said variable speed devices opposite in effect.

In testimony whereof I have signed this specification.

HARVEY D. WILLIAMS.

modifications may be made without departing from the nature of my invention as defined in the appended claims.

I claim as my invention:

1. A device of the class described, comprising a plurality of power-transmitting units each having a driven carrier, two co-axial driving gears, and a toothed member in mesh with one of said gears and adapted to roll on the other gear, means for rotating in unison the like gears of the several units, and individually regulatable means for rotating the other driving gears of the several units.

2. A device of the class described, comprising a plurality of power-transmitting units each having two co-axial driving gears and planetary mechanism in mesh with both of them, unitary means for driving one of the gears of each unit at the same speed, and separate individually regulatable means for rotating the other driving gears of the several units.

3. A device of the class described, comprising a plurality of power-transmitting units or sections, variable speed driving devices for the individual sections, individual speed-adjusting devices for the several sections and a connection between driving devices of different sections to cause their speed to be adjusted with opposite effect.

4. A device of the class described, comprising a plurality of power-transmitting units or sections, variable speed driving devices for the individual sections, individual speed-adjusting devices for the several sections and an operative connection between said devices to cause the speed of one of them to be varied relatively to the speed of another section.

5. A device of the class described, comprising a plurality of power-transmitting units or sections, variable speed driving devices for the individual sections, speed-adjusting members for each of said sections, and a connection between adjacent speed-adjusting members to cause them to move simultaneously in opposite directions and with opposite effect.

6. A device of the class described, comprising a plurality of power-transmitting units or sections, variable speed driving devices for the individual sections, sliding speed-adjusting members for each of said sections, located in alignment with each other and threaded at their adjoining portions, and a turnbuckle for shifting such sliding members simultaneously in opposite directions.

7. A device of the class described, comprising a plurality of power-transmitting units or sections, variable speed driving devices for the individual sections, sliding speed-adjusting members located in longitudinal alignment and operatively connected with the individual sections, said members beings spaced from each other and screw-threaded at their adjacent ends, turnbuckles mounted on said threaded ends of two adjacent speed-adjusting members and adapted to share the longitudinal motion of said members, whereby upon the turning of a particular turnbuckle, all the speed-adjusting members and all the turnbuckles to one side of such turnbuckle will be moved in one direction, and all the turnbuckles and speed-adjusting members on the other side of such turnbuckle will be moved in the opposite direction.

8. A device of the class described comprising a plurality of power transmitting units or sections, variable speed driving devices capable of being adjusted to different set positions for driving said sections at different speeds, a controlling device for each of said variable speed devices to adjust its respective device to set position and a connection between the controlling devices of different sections to cause them to be adjusted to produce an opposite speed effect upon their respective speed devices.

9. A device of the class described, comprising a plurality of power transmitting units or sections, a variable speed driving device for each of said sections, a controlling device for each of said variable speed driving devices, means to connect all of the controlling devices to cause them to be operated simultaneously to produce a similar change of speed in each of said variable speed devices, said connecting means including means for permitting said controlling devices to be actuated to produce a change of speed in said variable speed devices opposite in effect.

In testimony whereof I have signed this specification.

HARVEY D. WILLIAMS.

Certificate of Correction.

It is hereby certified that the domicile of the assignee in Letters Patent No. 1,530,966, granted to Harvey D. Williams, of Wallingford, Connecticut, for an improvement in "Power-Transmitting Devices," was erroneously written and printed as "New Haven, Connecticut," whereas said name should have been written and printed as *Waterbury, Connecticut*, as shown by the records of assignments in this office; and that the said Letters Patent should be read with this correction therein that the same may conform to the record of the case in the Patent Office.

Signed and sealed this 5th day of May, A. D. 1925.

[SEAL.]

KARL FENNING,
*Acting Commissioner of Patents.*

Certificate of Correction.

It is hereby certified that the domicile of the assignee in Letters Patent No. 1,530,966, granted to Harvey D. Williams, of Wallingford, Connecticut, for an improvement in " Power-Transmitting Devices," was erroneously written and printed as " New Haven, Connecticut," whereas said name should have been written and printed as *Waterbury, Connecticut*, as shown by the records of assignments in this office; and that the said Letters Patent should be read with this correction therein that the same may conform to the record of the case in the Patent Office.

Signed and sealed this 5th day of May, A. D. 1925.

[SEAL.]
              KARL FENNING,
              *Acting Commissioner of Patents.*